(12) United States Patent  
Macquin et al.

(10) Patent No.: US 9,375,763 B2  
(45) Date of Patent: Jun. 28, 2016

(54) AUTONOMOUS CLEANING DEVICE FOR SEISMIC STREAMERS AND METHOD

(71) Applicant: CGG SERVICES SA, Massy (FR)

(72) Inventors: Raphaël Macquin, Montrouge (FR); Camille Lapierre, Bergen (NO); Bernard Le Bars, Crozon (FR)

(73) Assignee: CGG SERVICES SA, Massy (FR)

( * ) Notice: Subject to any disclaimer, the term of this patent is extended or adjusted under 35 U.S.C. 154(b) by 0 days.

(21) Appl. No.: 14/768,629

(22) PCT Filed: Mar. 10, 2014

(86) PCT No.: PCT/EP2014/054601
§ 371 (c)(1),
(2) Date: Aug. 18, 2015

(87) PCT Pub. No.: WO2014/135706
PCT Pub. Date: Sep. 12, 2014

(65) Prior Publication Data
US 2016/0001336 A1 Jan. 7, 2016

Related U.S. Application Data

(60) Provisional application No. 61/818,006, filed on May 1, 2013, provisional application No. 61/792,308, filed on Mar. 15, 2013, provisional application No. 61/774,922, filed on Mar. 8, 2013.

(51) Int. Cl.
*B08B 9/023* (2006.01)
*G01V 13/00* (2006.01)
*B63C 11/52* (2006.01)
*B63B 21/66* (2006.01)

(52) U.S. Cl.
CPC ............... *B08B 9/023* (2013.01); *G01V 13/00* (2013.01); *B63B 21/663* (2013.01); *B63C 11/52* (2013.01)

(58) Field of Classification Search
CPC .......... B63C 11/52; B08B 1/04; B08B 9/023; G01V 13/00; G01V 1/38
USPC ............................... 114/222; 367/15; 134/6, 9
See application file for complete search history.

(56) References Cited

U.S. PATENT DOCUMENTS 5,026,212 A 6/1991 Do
5,765,968 A 6/1998 Lee
(Continued)

FOREIGN PATENT DOCUMENTS

| JP | 2012040538 A | 3/2012 |
|----|--------------|--------|
| WO | 2010/048039 A2 | 4/2010 |
| WO | 2012/154055 A1 | 11/2012 |

OTHER PUBLICATIONS

International Search Report mailed Sep. 11, 2014, in related International Application No. PCT/EP2014/054601.
(Continued)

*Primary Examiner* — Lars A Olson
(74) *Attorney, Agent, or Firm* — Patent Portfolio Builders PLLC

(57) ABSTRACT

A cleaning device for cleaning a marine element towed in water and related methods are provided. The cleaning device includes a body configured to enclose a marine element; at least one wing fixedly attached to the body and configured to impart translational motion to the body when flowing in water; and a keel attached to the body and configured to limit a rotation of the body. The at least one wing is oriented relative to the body so that the cleaning device travels from a head portion toward a tail portion of the marine element when the marine element is towed at an angle less than a triggering angle with a traveling direction of a vessel towing the marine element.

18 Claims, 10 Drawing Sheets

(56) References Cited

U.S. PATENT DOCUMENTS

| | | |
|---|---|---|
| 7,145,833 B1 | 12/2006 | Hoogeveen |
| 7,409,919 B2 | 8/2008 | Hoogeveen et al. |
| 7,754,018 B2 | 7/2010 | Lepage et al. |
| 2005/0268835 A1 | 12/2005 | Le Page et al. |
| 2006/0054186 A1 | 3/2006 | Lepage et al. |
| 2008/0127875 A1 | 6/2008 | Hoogeveen et al. |
| 2011/0197919 A1 | 8/2011 | Tilley |
| 2012/0176860 A1 | 7/2012 | Stenzel et al. |
| 2012/0222709 A1 | 9/2012 | Karlsen et al. |
| 2013/0028052 A1 | 1/2013 | Routh et al. |
| 2013/0265850 A1 | 10/2013 | Wu |
| 2014/0254311 A1 | 9/2014 | Macquin |

OTHER PUBLICATIONS

Written Opinion mailed Sep. 11, 2014, in related International Application No. PCT/EP2014/054601.

Extended European Search Report in related European Application No. 14162720.8, dated Jul. 29, 2015.

Extended European Search Report in related European Application No. 14158088.6, dated Aug. 3, 2015.

Dong, S., et al., "Least-squares reverse time migration: towards true amplitude imaging and improving the resolution", SEG 83rd Annual International Meeting, Las Vegas, Nevada, Technical Program Expanded Abstracts, Sep. 1, 2012, pp. 1-5.

Paffenholz, J., et al., "Subsalt multiple attenuation and imaging: observations from the Sigsbee2B synthetic data", SEG International Exposition and 72nd Annual Meeting, Salt Lake City, Utah, Expanded Abstracts, Oct. 6-11, 2002, pp. 1-4.

Xu, S., et al., "3D angle gathers from reverse time migration", Geophysics, vol. 76, No. 2, Mar.-Apr. 2011, pp. S77-S92.

Zhang, Y., et al., "Practical Issues of Reverse Time Migration—True-amplitude Gathers, Noise Removal and Harmonic-source Encoding", First Break, vol. 26, Jan. 2009, pp. 29-35, XP002742114.

Zhang, Y., et al., "Predicting multiples using a reverse time demigration", SEG 83rd Annual International Meeting, Las Vegas, Nevada, Expanded Abstracts, Sep. 1, 2012, pp. 1-5.

AUTONOMOUS CLEANING DEVICE FOR SEISMIC STREAMERS AND METHOD

CROSS REFERENCE TO RELATED APPLICATIONS

The present application is a continuation of International Application No. PCT/EP2014/054601, filed on Mar. 10, 2014, which claims the benefit of priority under 35 U.S.C. §119(e) to U.S. Provisional Application No. 61/818,006 filed on May 1, 2013; U.S. Provisional Application No. 61/792,308 filed on Mar. 15, 2013 and U.S. Provisional Application No. 61/774,922 filed on Mar. 8, 2013. The entire contents of each of the above documents is hereby incorporated by reference into the present application.

BACKGROUND

1. Technical Field

Embodiments of the subject matter disclosed herein generally relate to cleaning devices for streamers used in marine seismic surveying and, more particularly, to autonomous cleaning devices and related methods for cleaning marine growth and other contaminants deposited on marine equipment towed underwater.

2. Discussion of the Background

Marine seismic surveying investigates and maps the structure and character of geological formations under a body of water using reflection seismology. Reflection seismology is a method of geophysical exploration especially helpful in the oil and gas industry. In marine reflection seismology, the depth and the horizontal location of features causing reflections of seismic waves are evaluated by measuring the time it takes for the seismic waves to travel to receivers. These features may be associated with subterranean hydrocarbon reservoirs.

A typical marine seismic surveying system is illustrated in FIG. 1. A vessel 100 tows a seismic source 102 and plural streamers 106 (only one shown for simplicity), with each streamer carrying an array of seismic receivers 104 (e.g., hydrophones, geophones, accelerometers, or a combination thereof). It is desirable to maintain the streamers at predetermined horizontal cross-line distances (i.e., along an axis perpendicular to the towing direction T), and at predetermined depths (e.g., 10 m) relative to the water surface 108. The seismic source 102 is configured to generate a seismic wave 110 that propagates downward (down, up and vertical being defined relative to gravity) toward the seafloor 120 and penetrates formations 125 under seafloor 120 until it is eventually reflected at discontinuous locations such as 122a and 122b. The reflected seismic waves 130a and 130b propagate upward and can be detected by one of receivers 104 on streamer 106. Based on the data collected by receivers 104, an image of the subsurface formation is generated by further analyses of the collected data.

To maintain the streamers at a desired position (i.e., such as to have predetermined cross-line distances and predetermined depths), conventionally, a head float 140 and a tail buoy 150 are attached to the streamer. Position control devices 152 (e.g., birds) may be attached to the streamer, every 300 m, to control the streamer's position.

Significant amounts of bio-fouling settlement accumulates on the streamers' exterior surface, which can obscure the reflected seismic wave and significantly increase streamer drag. The rate of accumulation and the impact of bio-fouling and other contaminants depend on factors, among others, such as geographic location, water temperature, and season. The gooseneck barnacle is the most common bio-fouling organism found on marine streamers.

Cleaning such contaminants from the streamers' exterior is desirable and beneficial. For example, a cleaning device 160 may be moved along the streamer to clean contaminants from the exterior thereof.

An active cleaning device, such as the one disclosed in U.S. patent application Ser. No. 14/156,818, assigned to the assignee of the present application, includes one or more cleaning elements (e.g., brushes) and a mechanism configured to attach and to roll the cleaning device along the streamer in order to clean its exterior. More specifically, as illustrated in FIG. 2, a cleaning device 200 is located around a streamer 202 and configured to autonomously, i.e., without human intervention, move up and down the streamer, between two obstacles. Cleaning device 200 has a body 210 configured to support one or more wings 212. A cleaning tool 220, e.g., a brush, a magnet, etc., may be attached to body 210. In one application, the cleaning tool may have an anti-fouling coating or may provide an anti-fouling coating to the streamer. One or more cleaning tools may be located on cleaning device 200. A switching and locking mechanism 214 is attached to body 210 and determines, when contacting stoppers 204 or 206, a change in the wings' orientation (e.g., angle 213). By changing the wings' orientation, cleaning device 200 may rotate, like a screw, about streamer 202, along one of the two directions 218 and 219. Depending on the orientation of wings 212, a cleaning device may rotate clockwise or counter-clockwise around streamer 202. This rotation determines how the cleaning device moves along the streamer in any of directions 230 and 232.

However, it is known that the streamer has various parts and/or components, some with a larger diameter than others, and an efficient cleaning device needs to be able to cross these parts while it cleans. Further, the cleaning device's existing mechanisms for changing wing position are complicated and prone to failure, especially if marine fouling gets inside these mechanisms.

Therefore, there is a need to develop streamer cleaning devices that operate, autonomously, upstream and downstream over variable diameter streamers, with reliable mechanical parts not prone to failure.

BRIEF SUMMARY OF THE INVENTION

Streamer positioning devices (birds) have rendered conventional streamer cleaning devices obsolete, because it became impractical or impossible to pass over these birds. Cleaning devices and related methods according to various embodiments provide an efficient streamer cleaning solution, being designed to clean portions of the streamers between neighboring birds and to remain mounted on these streamer portions between cleanings.

According to an embodiment, there is a cleaning device that includes a body configured to enclose a marine element; at least one wing fixedly attached to the body and configured to impart translational motion to the body when flowing in water; and a keel attached to the body and configured to limit a rotation of the body. The at least one wing is oriented relative to the body so that the cleaning device travels from a head portion toward a tail portion of the marine element when the marine element is towed at an angle less than a triggering angle with a traveling direction of a vessel towing the marine element.

According to another embodiment, there is a cleaning device that includes a body configured to enclose a marine element; at least one wing rotatably attached to the body and configured to impart translational and rotational motion to the body when interacting with the water; and an antifouling device attached to the body and configured to remove fouling material inside the body.

According to another embodiment, there is a seismic surveying system that includes a marine element configured to be towed in water; and a cleaning device attached to the marine element and configured to clean the marine element. The cleaning device includes a body configured to enclose the marine element; at least one wing rotatably attached to the body and configured to impart translational and rotational motion to the body when interacting with the water; and an antifouling device attached to the body and configured to remove fouling material inside the body.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer cleaning device used in marine seismic surveying. However, the embodiments to be discussed next are not limited to cleaning devices operating on streamers, but may be used to clean other cable-like structures.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Cleaning devices, according to various embodiments described below, facilitate maintaining streamer portions free of bio-fouling and other contaminants between obstacles that are too large to be passed over. A streamer may have plural cleaning devices positioned to clean at least the portions of the streamer having a high rate of accumulation of bio-fouling and other contaminants. Cleaning devices may be mounted on all portions of streamers. These cleaning devices remain attached to the streamers between cleaning operations. These cleaning devices operate autonomously during the seismic survey, without using electric or pneumatic pressure from the streamers or the vessel. Movement of the cleaning device is produced by water flow. The overall cost of having plural cleaning devices is mitigated by reduced operating cost for manual barnacle cleaning, and by using cleaning devices only at sections that are hard to reach and have stronger barnacle growth (e.g., the front-most sections on each streamer).

Figure 1:
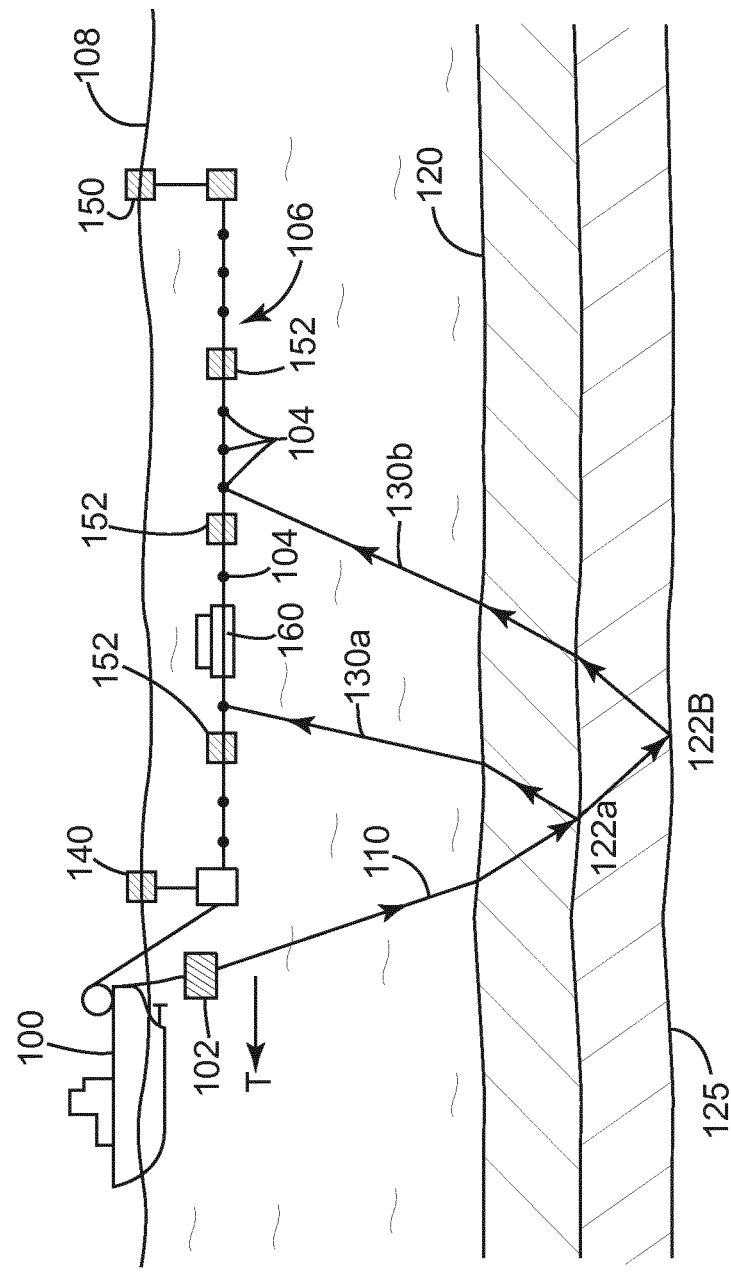
FIG. 1 is a schematic diagram of a conventional marine seismic surveying system.
Figure 2:
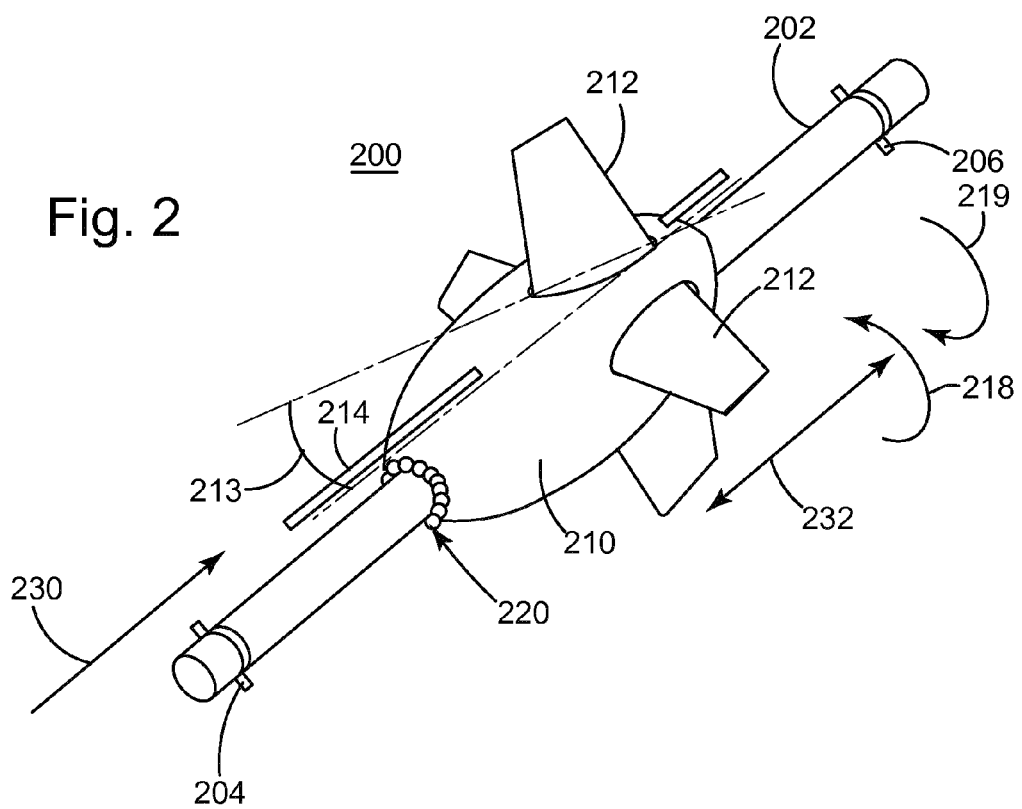
FIG. 2 illustrates an active cleaning device having a movable wing.
Figures 3, 4:
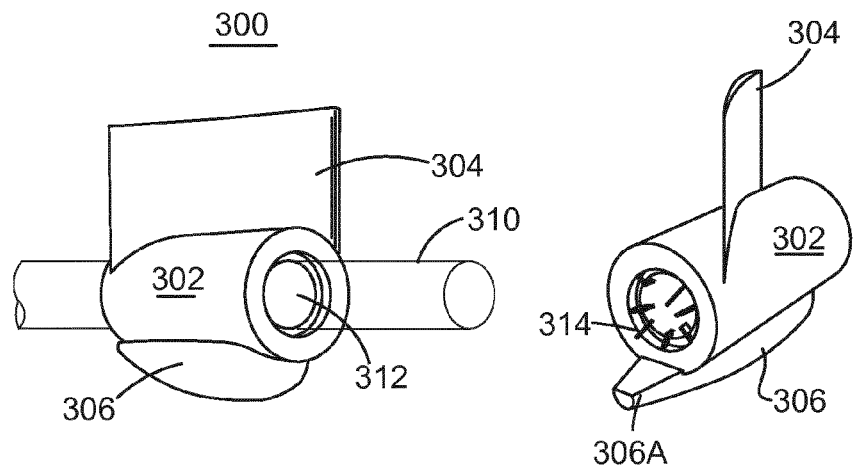
FIGS. 3 and 4 illustrate a passive cleaning device having a fixed wing according to an embodiment.

According to an embodiment illustrated in FIG. 3, a cleaning device 300 has a body 302, a foil (or wing) 304 and a keel (or balasted wing) 306. Body 302 is configured to enclose a streamer 310 or other similar structure and be able to slide along the streamer. For this reason, body 302 may have inside wheels as shown in FIG. 2 or any other equivalent structure that promotes sliding. In one embodiment, no wheels or sliding mechanism are provided and the interior 312 of body 302 is made of a special material (e.g., Teflon) to slide along streamer 310. In still another embodiment, body 302 includes one or more cleaning mechanisms 314 (e.g., a brush, a blade, etc.) as illustrated in FIG. 4. Other cleaning mechanisms may be used, as discussed later.

FIGS. 3 and 4 show a single foil 304 being fixed to body 302 and unable to move, which is different from the embodiment illustrated in FIG. 2. However, it is possible to have multiple foils if necessary. Foil 304 may have various shapes and sizes, as will be recognized by those skilled in the art, as long as the foil produces a movement of the entire cleaning device along the streamer as discussed later. For stability and to prevent the cleaning device from rotating about the streamer, keel 306 is also fixedly attached to body 302. In one embodiment, keel 306 is attached to body 302 directly opposite foil 304. However, in another embodiment, keel 306 may be attached to body 302 to make an angle of less than 180° with foil 304. In one embodiment, keel 306 may have a portion 306A that extends beyond body 302, as illustrated in FIG. 4. Portion 306A may be in front or back of body 302.

Body 302, foil 304 and keel 306 may be made from one or more of a composite material, plastic or metal. Body 302 may be made of two halves joined with connectors to each other around streamer 310. The connectors may include screws or other elements.

Figure 5:
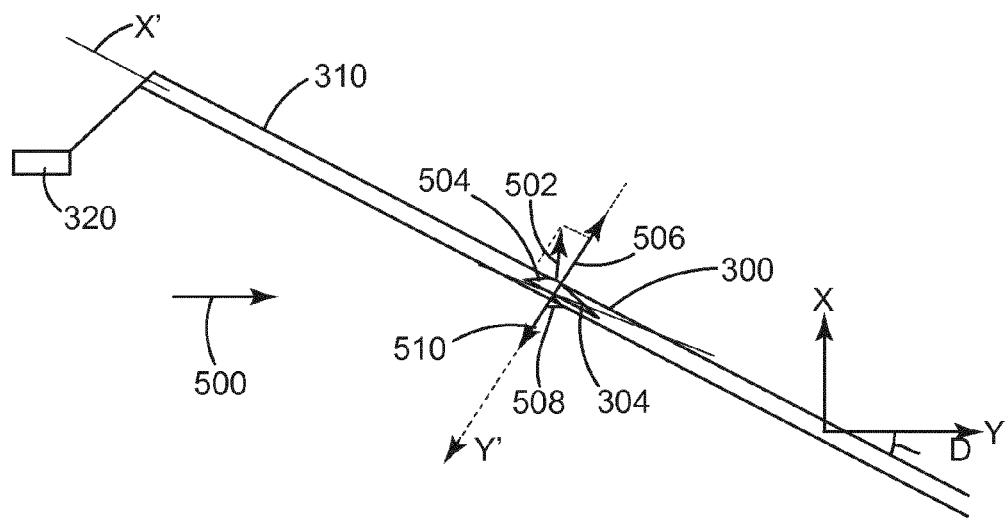
FIG. 5 schematically illustrates the forces acting on a fixed wing of a passive cleaning device according to an embodiment.

The forces acting on foil 304 when a vessel 320 towing streamer 310 travels along Y direction are now discussed with regard to FIG. 5. The movement of streamer 310 through water generates a flow 500 along axis Y, which acts on cleaning device 300. This flow generates a hydrodynamic force 502 on foil 304. Hydrodynamic force 502 may be decomposed along two perpendicular axes X' and Y', where X' is along streamer 310 and Y' is perpendicular to X'. The X' component 504 of the hydrodynamic force 502 is along the streamer and Y's component 506 is perpendicular to the streamer. A friction force 508 acts opposite the X' component 504, but is smaller than this component, so that a net force (504-508) along streamer 310 acts on cleaning device 300, making it slide along the streamer. This happens if an angle α between streamer 310 and axis Y is larger than a triggering angle, which depends on the speed of the vessel, the foil's shape, size, etc. When angle α is equal to the triggering angle, the friction force is equal to the X' component 504, and the cleaning device stops moving. The Y' component 506 is canceled by the reaction force 510 exerted by streamer 310 on cleaning device 300, or by another part of the cleaning device, e.g. a profiled keel.

Figure 6B:
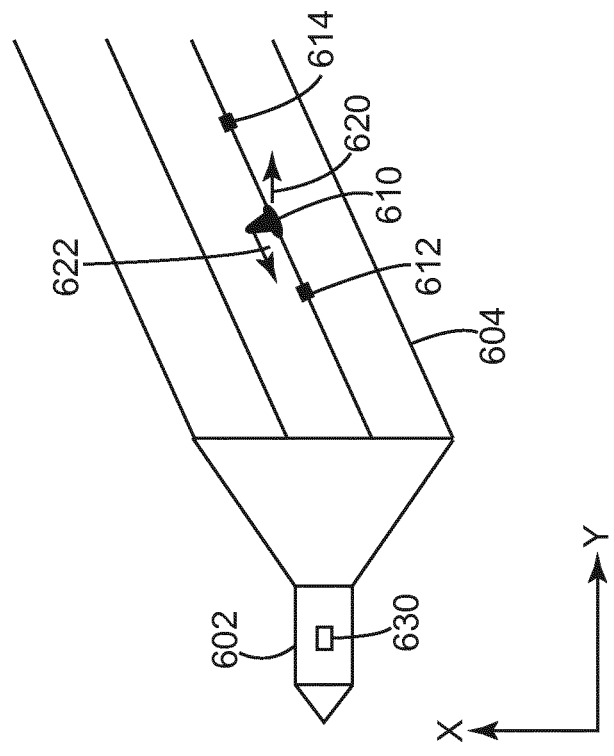
FIGS. 6A-B illustrate how a passive cleaning device moves upstream and downstream a marine element according to an embodiment.
Figure 6A:
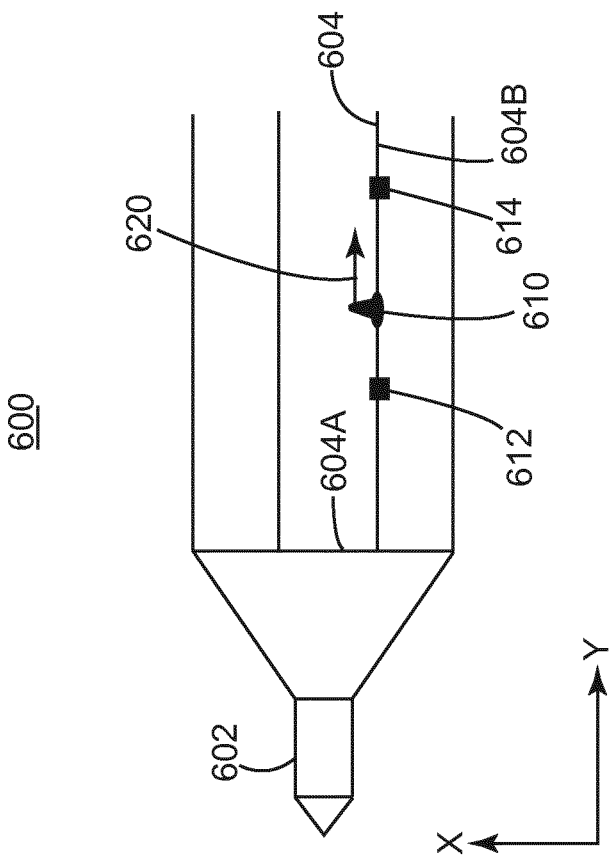

The autonomous movement of cleaning device 300 is now discussed with regard to FIGS. 6A-B. Note that cleaning device 300 has one or more fixed foils and no active mechanism for changing one or more foils' direction, nor for actuating it along the streamer. As illustrated by system 600 of FIG. 6A, a vessel 602 tows at least one streamer 604. For simplicity, streamer 604 shows a single cleaning device 610 between two obstacles 612 and 614 (e.g., two birds). If streamer 604 is substantially parallel to axis Y (i.e., traveling direction), the flow force (drag force) 620 (or 500 in FIG. 5) acts on the cleaning device's foil and makes it move from the head 604A of the streamer toward its tail 604B, i.e., from bird 612 toward bird 614. The cleaning device stops moving along the streamer when it makes contact with a bird or other obstacle 614.

To return the cleaning device to bird or obstacle 612, streamer 604 needs to make an angle α larger than the triggering angle so that the X' component force 622 (the equivalent of component force 504 in FIG. 5) moves the cleaning device upstream along streamer 604, i.e., from bird 614 toward bird 612, as illustrated in FIG. 6B. Angle α may be achieved in at least two different ways, which are now discussed. According to a first case, the birds on the streamer may be instructed by a global control device 630, placed on vessel 602, to achieve the triggering angle α as the seismic survey progresses. In this way, when the streamer acquires a sufficient feather angle in the right direction, the foil on the cleaning device acquires a sufficient attack angle to generate a propulsive force. The cleaning device can then sail upward and clean the streamer in the up-going direction. This mode is not preferred because of the noise introduced by the birds pushing aside the streamers and also because of the noise introduced by the cleaning devices. However, this process may be repeated as often as necessary.

A more advantageous mode is a turning mode, i.e., when the vessel has finished surveying an active line and is turning to position the spread along another survey line. During the turning period, no active shooting and recording takes place and, thus, the noise made by the birds and cleaning device is irrelevant. Further, by turning the streamers relative to the initial towing direction –Y, the required angle α between streamer 604 and flow 620 is achieved, and the cleaning device is moved to its initial position. This process may be repeated any time an active survey line is achieved.

According to this embodiment, there is no active mechanism involved in moving the cleaning device each way along the streamer, thus, the potential of a component failing is maximally reduced. Also, such a cleaning device is light because no active actuating device and power source are necessary.

Figure 7:
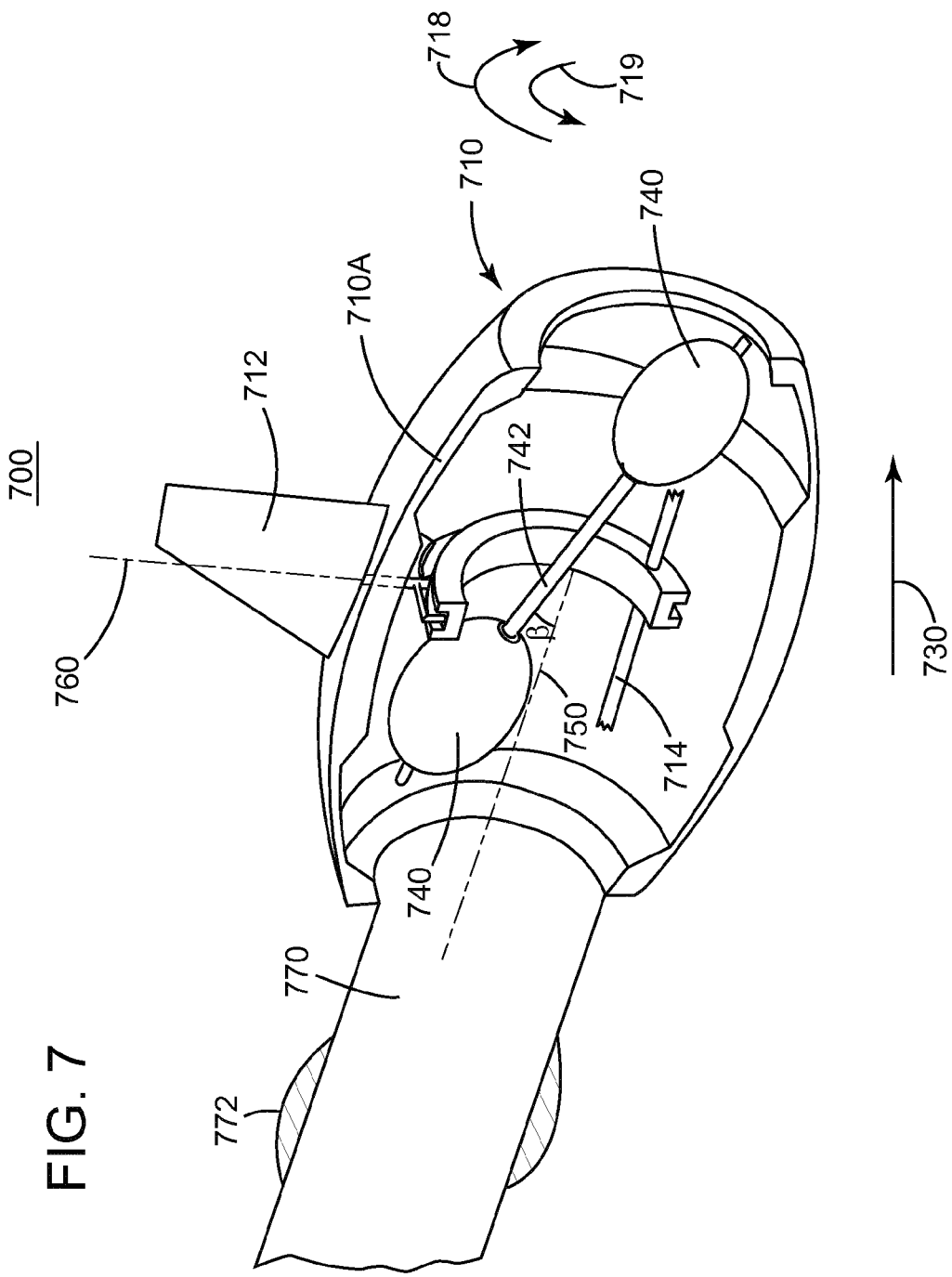
FIG. 7 illustrates an active cleaning device.

According to another embodiment discussed now, a cleaning device may have an actuating device (e.g., rotatable wing) for actuating it both upstream and downstream on the streamer. Such cleaning device 700 is illustrated in FIG. 7, which corresponds to FIG. 6 of U.S. patent application Ser. No. 14/156,818, the entire content of which is included herein. Cleaning device 700 has a body part 710A, which may be half of body 710, and one or more wheels 740 located inside. Wheels 740 have one or more axles 742 that make an angle β with a longitudinal axis 750 of the cleaning device. Angle β may be around 5°. However, other values may be used. The number of wheels and axles may vary, depending on the size of the streamer, the size of the cleaning device, the towing speed, etc.

This wheels configuration, i.e., the axles making a fixed angle with longitudinal axis 750 of the cleaning device and the longitudinal axis of the streamer, combined with the fact that the wings impart a rotational motion to the cleaning device, results in a translational movement of the cleaning device, similar to a screw that has a given threaded pitch. Thus, in operation, when wings 712 make the cleaning device rotate along direction 718, the cleaning device moves along the streamer in the same direction as water flow 730. However, when the wings change their orientation relative to their axis 760, the cleaning device rotates along direction 719 and advances along the streamer in a direction opposite water flow 730 because the wheels' orientation does not change.

Switching and locking mechanism 714 may be responsible for changing the wings' direction and for locking their orientation when the cleaning device moves between the two stoppers.

However, such a device may have difficulties traversing small obstacles 772 present along streamer 770. Thus, according to an embodiment illustrated in FIG. 8, a cleaning device 800 has one or more wings 812 that are rotatable along a radial axis, and the rotation of the one or more wings is achieved by a switching mechanism 814, which may be similar to the one disclosed in U.S. patent application Ser. No. 14/156,818. Cleaning device 800 also includes a frame 830 having two frame parts 832 and 834 rotatably connected to each other by a hinge 836. A spring or similar element 838 connects the two frame parts 832 and 834. Each frame part is connected to a corresponding wheel frame 839. Wheel frame 839 holds wheel 840 and can be rotated relative to frame part 832 about axis 842. Thus, an angle between wheel 840' longitudinal axis 844 and frame part 832' longitudinal axis 846 can be adjusted to control cleaning device speed along the streamer.

When cleaning device 800 encounters an obstacle 872 on streamer 870, because of the spring element 838, the front or back wheels 840 can pivot away from the streamer to accommodate the obstacle's increased diameter. Then, the remaining wheels do the same until the entire cleaning device has passed the obstacle. A spring constant of the spring element may be adjusted depending on the diameter of the streamer, expected obstacles, expected amount of fouling, etc. In one embodiment, spring element 838 is positioned between frame 830 and streamer 870 to reduce the overall diameter of housing 810. In still another embodiment, spring element 838 is located between wheels 840, at substantially the same longitudinal position as wing 812.

Figure 8:
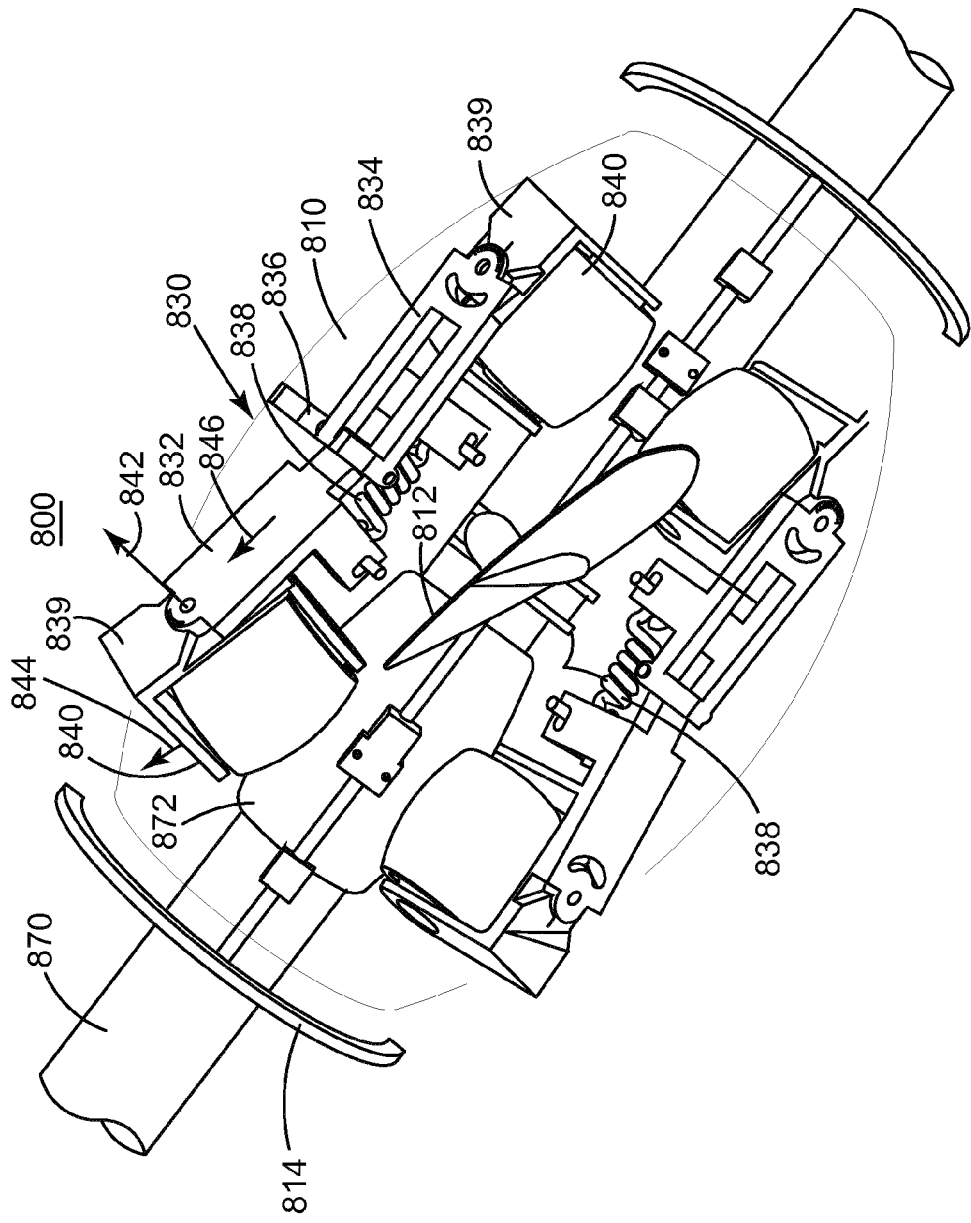
FIG. 8 illustrates an active cleaning device configured to pass obstacles having different diameters according to an embodiment.
Figure 9:
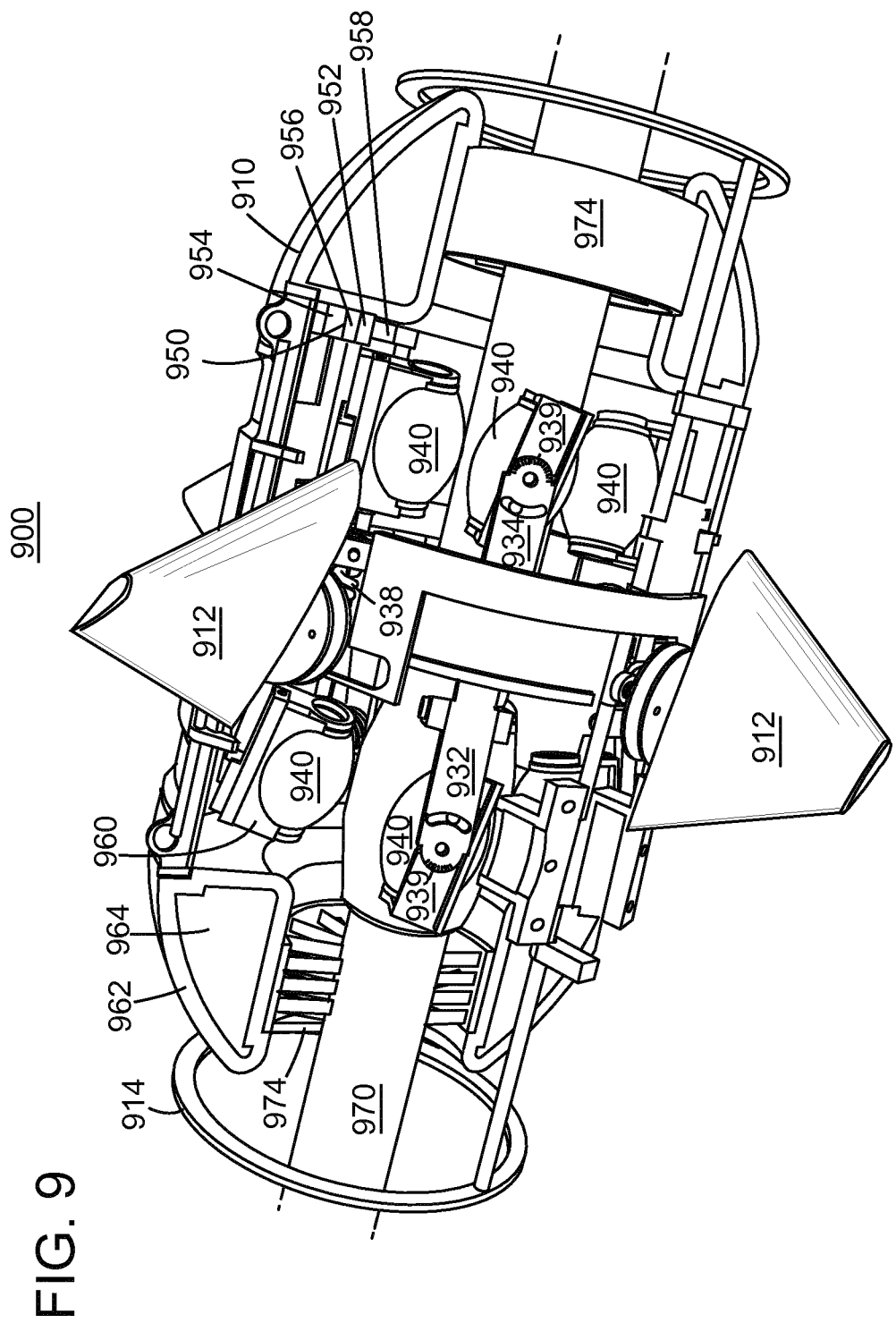
FIG. 9 illustrates an active cleaning device having a biocide cartridge according to an embodiment.

According to another embodiment illustrated in FIG. 9, a cleaning device 900 may include wings 912, switching mechanism 914, wheels 940, frame parts 932 and 934, wheel frames 939, and spring element 938 similar to those illustrated in FIG. 8. However, in addition to the features illustrated in FIG. 8, cleaning device 900 also includes an antifouling device, e.g., biocide cartridge, 950 located inside housing 910. If the antifouling device is a biocide cartridge, the cartridge may be configured to hold a given amount of a biocide substance to be released inside housing 910 to prevent the fouling material from growing inside the cleaning tool. Biocide cartridge 950 may be a passive element configured to slowly release (continuously or not) the biocide material. In one application, antifouling device 950 is an active element, i.e., it may include one or more ultra-violet (UV) light generation devices 952 powered from an internal power source (e.g., battery or dynamo) 954 and controlled by a controller 956. The UV light device may be selected to disrupt the lifecycle of the fouling material, or to create an unwelcome habitat for the microorganisms trying to make their home inside the cleaning device. Alternatively or in addition, the antifouling device may include an ultrasound device 958 powered by power source 954 and controlled by controller 956. A combination of passive and active elements may be used, depending on the severity of the fouling.

In another application, one or more wheel cleaning elements 960 are located next to a corresponding wheel for removing fouling and other material that may adhere to the wheel 940. Thus, wheel cleaning element 960 acts on corresponding wheel 940. Any number of wheels 940 may be provided with wheel cleaning element 960. One or more streamer cleaning elements (e.g., scraping blade or brush) 974 may be attached to housing 910 for further cleaning streamer 970. Further improvements to cleaning device 900 may include one or more cavities 962 filled with foam or similar material 964 with positive buoyancy to make the overall buoyancy of cleaning device 900 as close as possible to zero. In one application, the cleaning device's buoyancy is zero.

Figure 10:
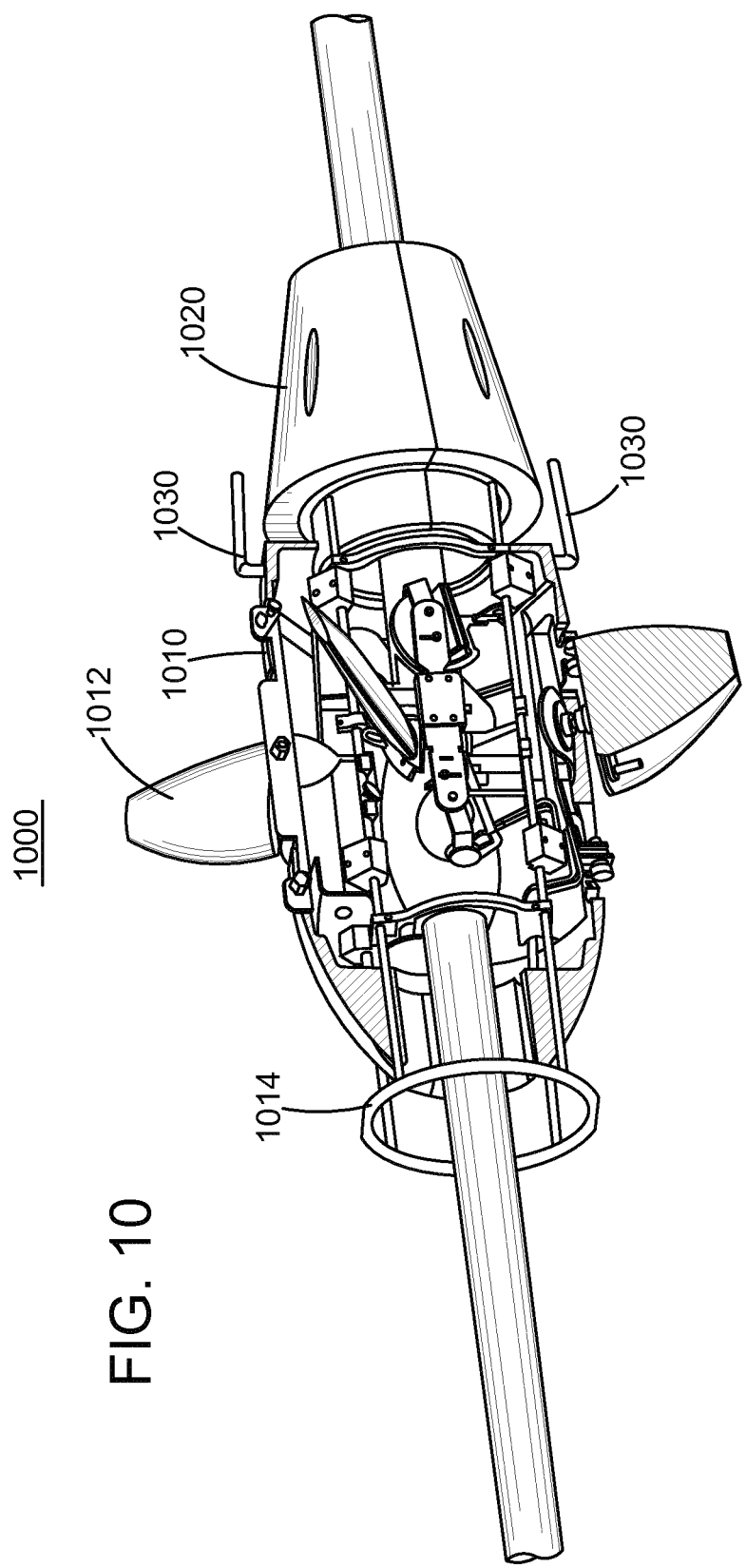
FIG. 10 illustrates a cleaning device having one or more attachments for achieving an aerodynamic shape according to an embodiment.

Another improvement to the cleaning device is illustrated in FIG. 10. Cleaning device 1000 may be any of the devices discussed above or another known device, i.e., having fixed or rotatable wings. It may include body 1010, one or more wings 1012 and a switching mechanism 1014 for changing an orientation of wing 1012. Note that for a cleaning device similar to that described in FIG. 3, no switching mechanism is necessary. Body 1010 may be designed to have an aerodynamic shape to reduce drag when moving along the streamer. To further reduce drag, tail and/or head portions 1020 (FIG. 10 shows for simplicity only a tail portion) may be attached to body 1010 so that the body's overall shape and tail and head portions achieve a hydrodynamic shape. In one embodiment, either one or both of the tail and head portions may have corresponding skirt portions 1030 attached to body 1010 to further reduce drag, i.e., directing water flow over the cleaning device's exterior surface.

Figure 11:
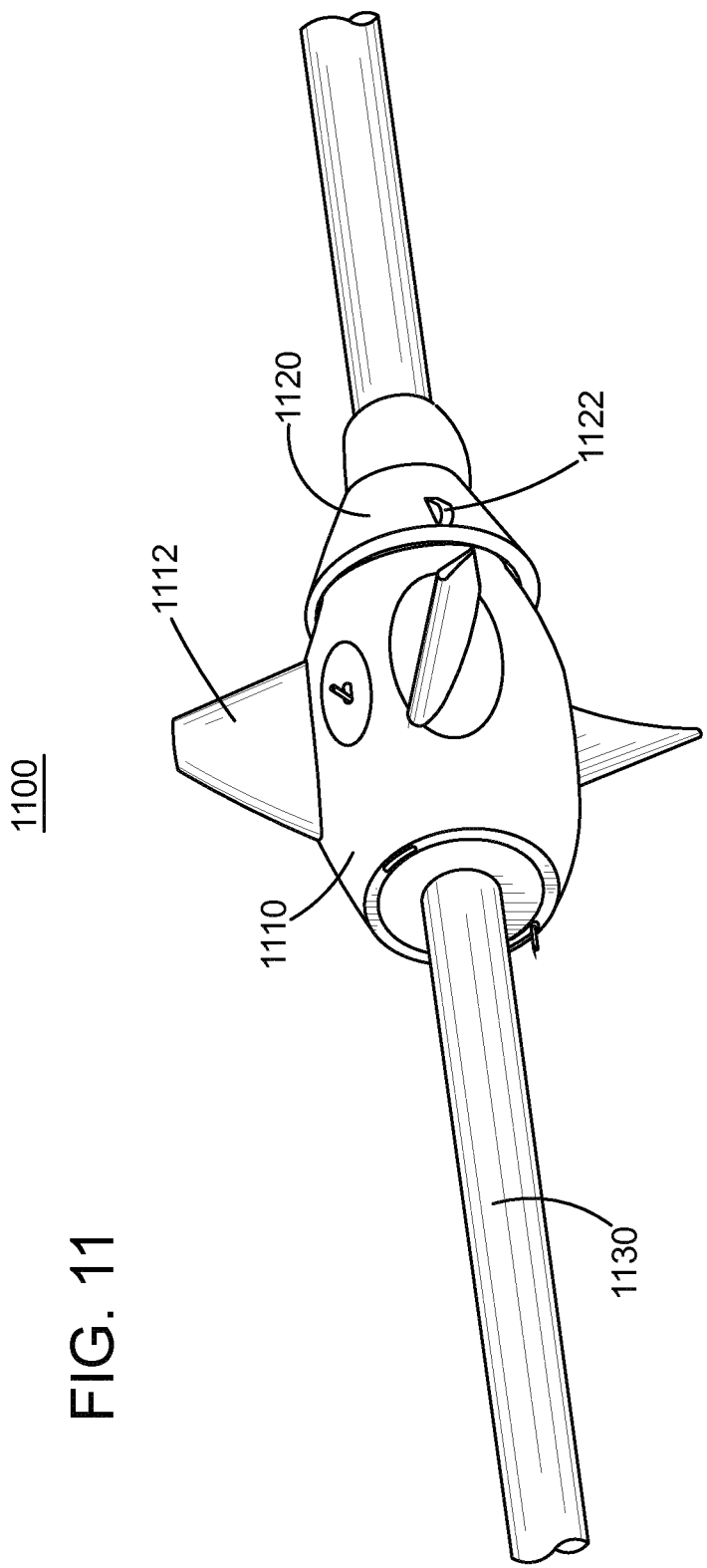
FIG. 11 illustrates a cleaning device and a docking station according to an embodiment.

According to another embodiment illustrated in FIG. 11, a cleaning device 1100 may be provided on streamer 1130 together with a docking station 1120. Docking station 1120 may be fixedly attached to streamer 1120 and may communicate with the streamer through inductive coupling to exchange data with the vessel towing the streamer. In one application, power may be transferred from the streamer to the docking station. Thus, when the cleaning device has docked with the docking station, instructions and/or power may be transferred to the cleaning device. Docking station 1120 may include a locking mechanism 1122 (e.g., electromagnet) for locking cleaning device 1100. Thus, during seismic acquisition, docking station 1120 locks the cleaning device in place to reduce the amount of noise produced. After an active survey line has been shot, while the vessel is turning to reposition for another survey line, a controller on the vessel instructs docking station 1120 to release cleaning device 1100 for cleaning streamer 1130. When the vessel starts to acquire data along the new survey line, the controller again instructs docking station 1120 to lock the cleaning device during the active part of the seismic acquisition. Note that docking station 1120 may work with any of the cleaning devices discussed above (i.e., with or without movable wings 1112) or with others known in the art.

In one embodiment, a cleaning device is positioned on the streamer, between two docking stations, so it can be locked at either end of its path. In one application, the docking station may be combined with an existing element on the streamer, for example, with a bird. In another application, the docking station may have an antifouling device as the cleaning device discussed with regard to FIG. 9 for removing fouling material. In still another application, the docking station may include a cleaning device for partially cleaning the cleaning device when the cleaning device is docked. In one embodiment, the docking station may exchange power and/or data with the cleaning device.

Figure 12:
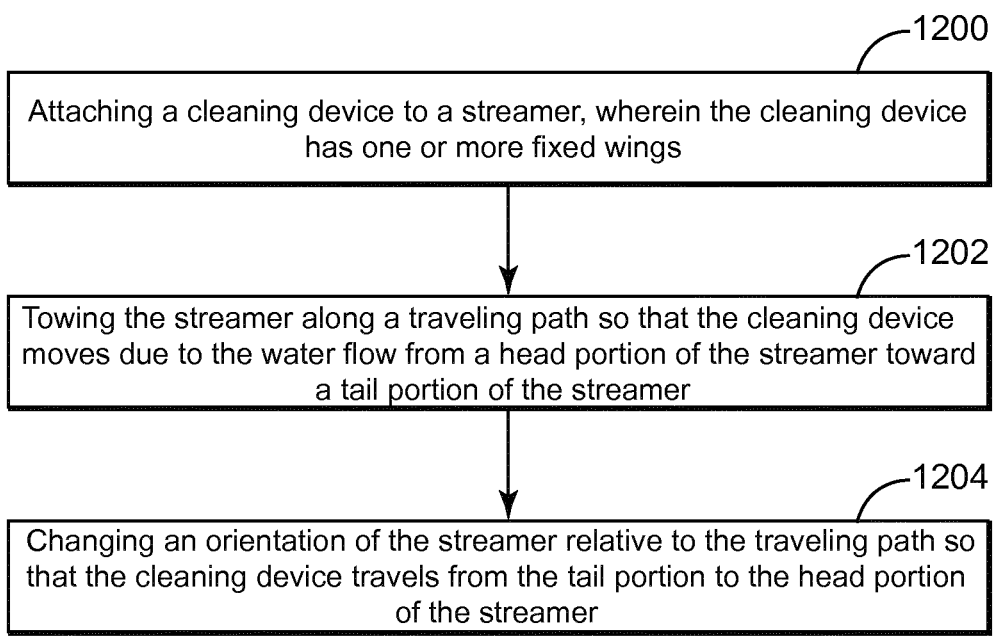
FIG. 12 is a flowchart of a method for cleaning a portion of a streamer according to an embodiment.

According to an embodiment illustrated in FIG. 12, there is a method for cleaning a streamer while being towed under water. The method includes a step 1200 of attaching a cleaning device to a streamer, wherein the cleaning device has one or more fixed wings, a step 1202 of towing the streamer along a traveling path so that the cleaning device moves due to the water flow from the streamer's head portion toward its tail portion, and a step 1204 of changing an orientation of the streamer relative to the traveling path so that the cleaning device travels from the streamer's tail portion to its head portion. The method may also include a step of using birds for changing the streamer orientation.

Alternatively, the method includes a step of turning the vessel relative to the traveling path. The method may further include a step of locating a docking station on the streamer and a step of instructing the docking station to lock the cleaning device while actively acquiring seismic data. The method may include a step of using a cleaning device having inside wheels that contact the streamer, and the wheels may be attached to corresponding frames that can pivot away from the streamer to accommodate elements attached to the streamer and having a larger diameter than the streamer. The method may also include a step of providing an antifouling device inside the cleaning device and releasing a biocide agent inside the cleaning device. Alternatively, the method may include a method of actively removing fouling material by generating UV light and/or ultrasound.

The disclosed exemplary embodiments provide a cleaning device for cleaning portions of a streamer. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A cleaning device comprising:
a body configured to enclose a marine element;
at least one wing rotatably attached to the body and configured to impart translational and rotational motion to the body when interacting with water;
an antifouling device attached to the body and configured to remove fouling material inside the body; and
first and second wheels located inside the body and configured to press against the marine element,
wherein the first and second wheels are attached to corresponding wheel frames and frame parts, and the frame parts are connected to each other with a spring element so that the cleaning device is configured to pass obstacles located on the marine element having larger diameters than the marine element.

2. The cleaning device of claim 1, wherein the antifouling device is a biocide cartridge configured to store and release a biocide material inside the body.

3. The cleaning device of claim 1, wherein the antifouling device is configured to generate ultra-violet light.

4. The cleaning device of claim 1, wherein the antifouling device is configured to generate ultrasound.

5. The cleaning device of claim 1, wherein the wheel frames are rotatably attached to the frame parts.

6. The cleaning device of claim 1, further comprising:
a wheel cleaning element configured to clean one of the first and second wheels.

7. The cleaning device of claim 1, further comprising:
a cavity filled with a positive buoyancy material for reducing a total buoyancy of the cleaning device.

8. The cleaning device of claim 1, further comprising:
a tail part attached to the body for achieving a more hydrodynamic form.

9. The cleaning device of claim 1, further comprising:
a docking station fixedly attached to the marine element and configured to lock the cleaning device.

10. A cleaning device comprising:
a body configured to enclose a marine element;
at least one wing rotatably attached to the body and configured to impart translational and rotational motion to the body when interacting with water;
an antifouling device attached to the body and configured to remove fouling material inside the body;
first and second wheels located inside the body and configured to press against the marine element; and
a wheel cleaning element configured to clean one of the first and second wheels.

11. The cleaning device of claim 10, wherein the antifouling device is a biocide cartridge configured to store and release a biocide material inside the body.

12. The cleaning device of claim 10, wherein the antifouling device is configured to generate ultra-violet light.

13. The cleaning device of claim 10, wherein the antifouling device is configured to generate ultrasound.

14. The cleaning device of claim 10, wherein the first and second wheels are attached to corresponding wheel frames and frame parts, and the frame parts are connected to each other with a spring element so that the cleaning device is configured to pass obstacles located on the marine element having larger diameters than the marine element.

15. The cleaning device of claim 10, wherein the wheel frames are rotatably attached to the frame parts.

16. The cleaning device of claim 10, further comprising:
a cavity filled with a positive buoyancy material for reducing a total buoyancy of the cleaning device.

17. The cleaning device of claim 10, further comprising:
a tail part attached to the body for achieving a more hydrodynamic form.

18. The cleaning device of claim 10, further comprising:
a docking station fixedly attached to the marine element and configured to lock the cleaning device.

* * * * *